US012602633B2

(12) United States Patent
Rao et al.

(10) Patent No.: US 12,602,633 B2
(45) Date of Patent: Apr. 14, 2026

(54) DATA CENTER GUIDE CREATION AND COST ESTIMATION FOR AUGMENTED REALITY HEADSETS

(71) Applicant: International Business Machines Corporation, Armonk, NY (US)

(72) Inventors: Sowjanya Rao, Hyderabad (IN); Rodolfo Lopez, Austin, TX (US); Aastha Khatri, Amarkantak (IN); Prakash Ramasamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 18/450,442

(22) Filed: Aug. 16, 2023

(65) Prior Publication Data

US 2025/0061390 A1 Feb. 20, 2025

(51) Int. Cl.
*G06Q 10/0633* (2023.01)
*G06Q 10/0631* (2023.01)
(Continued)

(52) U.S. Cl.
CPC . *G06Q 10/063112* (2013.01); *G06Q 10/0633* (2013.01); *G06T 11/60* (2013.01); *G06T 19/006* (2013.01)

(58) Field of Classification Search
CPC .............. G06Q 10/20; G06Q 10/0633; G06Q 10/0631; G06Q 30/0643; G06Q 30/0641; G06T 19/00; G06T 11/60
See application file for complete search history.

(56) References Cited

U.S. PATENT DOCUMENTS 8,749,396 B2 6/2014 Maggiore
9,838,844 B2 12/2017 Emeis
(Continued)

FOREIGN PATENT DOCUMENTS

| CN | 109781431 B | 12/2019 |
| JP | 6016268 B2 | 10/2016 |
| WO | 2019108651 A1 | 6/2019 |

OTHER PUBLICATIONS

J. Kim, M. Lorenz, S. Knopp and P. Klimant, "Industrial Augmented Reality: Concepts and User Interface Designs for Augmented Reality Maintenance Worker Support Systems," 2020 IEEE International Symposium on Mixed and Augmented Reality Adjunct (ISMAR-Adjunct), Recife, Brazil, 2020, pp. 67-69 (Year: 2020).*

(Continued)

*Primary Examiner* — Maria C Santos-Diaz
(74) *Attorney, Agent, or Firm* — Edward J. Wixted, III

(57) ABSTRACT

A method, computer program product and computer system to evaluate maintenance performance in a data center is provided. A processor provides an augmented reality device to a user performing a maintenance procedure, where the augmented reality device displays a guidance script to the user while performing the maintenance procedure. A processor determines an initial base cost associated with the maintenance procedure. A processor retrieves user activity data regarding the performance of the maintenance procedure. A processor determines an activity cost of the user performing the procedure. A processor, in response to the activity cost varying a threshold amount from the initial base cost, adjusts the initial base cost of the maintenance procedure based on the activity data of the user regarding the performance of the maintenance procedure.

20 Claims, 8 Drawing Sheets

(51) Int. Cl.
*G06T 11/60* (2026.01)
*G06T 19/00* (2011.01)

(56) References Cited

U.S. PATENT DOCUMENTS

| | | | | |
|---|---|---|---|---|
| 10,603,113 | B2 | 3/2020 | Lang | |
| 10,768,605 | B2 | 9/2020 | Dalal | |
| 10,907,963 | B2 | 2/2021 | Bender | |
| 11,080,939 | B1 | 8/2021 | Lafranchi | |
| 12,309,160 | B2* | 5/2025 | Varada | H04L 67/131 |
| 2014/0310595 | A1 | 10/2014 | Acharya | |
| 2016/0140868 | A1 | 5/2016 | Lovett | |
| 2018/0130260 | A1* | 5/2018 | Schmirler | G06F 3/011 |
| 2018/0239144 | A1 | 8/2018 | Woods | |
| 2018/0239425 | A1* | 8/2018 | Jang | G06F 3/015 |
| 2019/0060708 | A1 | 2/2019 | Fung | |
| 2019/0066411 | A1* | 2/2019 | Behrooznia | G07C 5/008 |
| 2019/0286906 | A1 | 9/2019 | Bivens | |
| 2019/0362556 | A1 | 11/2019 | Ben-Dor | |
| 2020/0117529 | A1 | 4/2020 | Qiao | |
| 2020/0242848 | A1 | 7/2020 | Ambler | |
| 2021/0027643 | A1 | 1/2021 | Schume | |
| 2021/0035333 | A1* | 2/2021 | Wright | G06V 20/20 |
| 2021/0112145 | A1 | 4/2021 | Amarpal | |
| 2021/0233294 | A1 | 7/2021 | Nunez | |
| 2022/0012947 | A1* | 1/2022 | Xie | G06T 19/006 |
| 2022/0096197 | A1 | 3/2022 | Song | |
| 2023/0136853 | A1* | 5/2023 | Xia | G06F 16/953 |
| | | | | 700/79 |
| 2024/0037512 | A1* | 2/2024 | Yamamura | G06Q 10/20 |
| 2024/0104856 | A1* | 3/2024 | Perumalla | G06T 19/20 |
| 2024/0127144 | A1* | 4/2024 | St. Pierre | G06Q 10/063112 |
| 2024/0320632 | A1* | 9/2024 | Yamamura | G06Q 10/063112 |
| 2024/0428472 | A1* | 12/2024 | El-Sana | G06Q 10/0631 |

OTHER PUBLICATIONS

Malta A, Farinha T, Mendes M. Augmented Reality in Maintenance-History and Perspectives. J Imaging. Jul. 10, 2023;9(7):142. doi: 10.3390/jimaging9070142. PMID: 37504819. (Year: 2023).*

A. Cachada et al., "Using AR Interfaces to Support Industrial Maintenance Procedures," IECON 2019—45th Annual Conference of the IEEE Industrial Electronics Society, Lisbon, Portugal, 2019, pp. 3795-3800, doi: 10.1109/IECON.2019.8927815. (Year: 2019).*

"IBM Appendix P", List of patents and patent applications to be treated as related, Filed Herewith, 2 pages.

Anonymous, "Human error most likely cause of datacentre downtime, finds study," ComputerWeekly [online], Mar. 18, 2013, 3 pages, Retrieved from the Internet: <URL: https://www.computerweekly.com/news/2240179651/Human-error-most-likely-cause-of-datacentre-downtime-finds-study>.

Deffeyes, S, "Mobile augmented reality in the data center", IBM J. Res. & Dev. vol. 55 No. 5 Paper 5 Sep./Oct. 2011, © 2011 IBM, 5 pages.

Disclosed Anonymous, "Augmented Reality for Cabling Systems", An IP.com Prior Art Database Technical Disclosure, IP.com No. IPCOM000250117D, IP.com Electronic Publication Date: Jun. 1, 2017, 5 pages.

Disclosed Anonymous, "Using Augmented Reality to Enhance Diagnostics, Repair and Assembly", An IP.com Prior Art Database Technical Disclosure, IP.com No. IPCOM000223150D, IP.com Electronic Publication Date: Nov. 5, 2012, 3 pages.

He et al., "An AR Operation and Maintenance System for Data Center", 2018 International Conference on Computer Science and Software Engineering (CSSE 2018) ISBN: 978-1-60595-555-1, 13 pages.

Lopez et al., "Data Center Guide Creation for Augmented Reality Headsets", U.S. Appl. No. 17/656,309, filed Mar. 24, 2022, 30 Pages.

* cited by examiner

200

START

202 — DETECT USER IN PROXIMITY TO A
DATA CENTER (DC) DEVICE

204 — RETRIEVE MAINTENANCE STATE FOR DATA
CENTER DEVICE

206 — DISPLAY ALERT OF MAINTENANCE STATE ON
AUGMENTED REALITY (AR) DEVICE

208 — RECEIVE CONFIRMATION FROM USER TO
BEGIN MAINTENANCE

210 — RETRIEVE GUIDANCE SCRIPT(S) BASED ON THE
MAINTENANCE STATE OF THE DC DEVICE

212 — EXECUTE GUIDANCE SCRIPT(S)

END

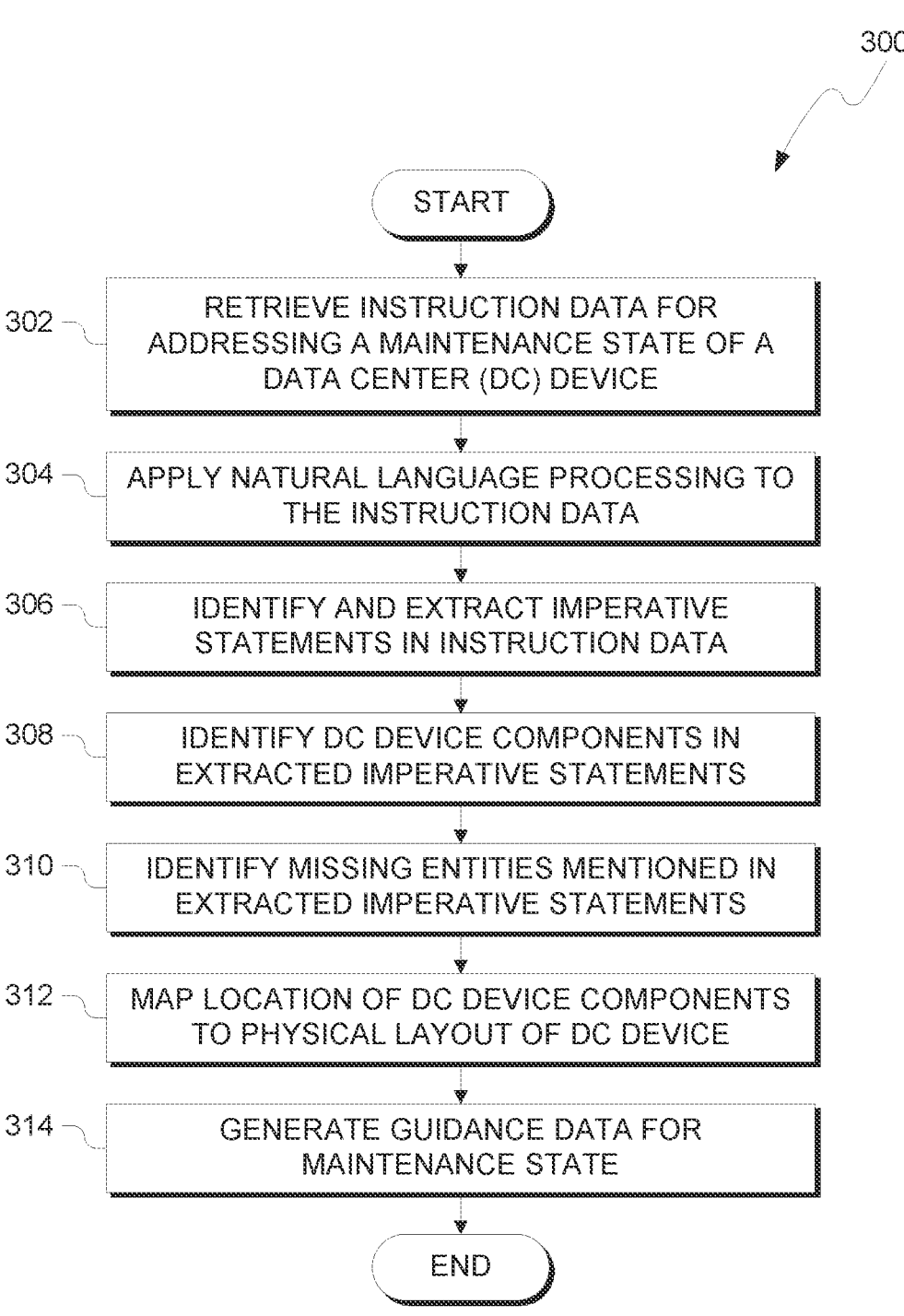

300

START

302 — RETRIEVE INSTRUCTION DATA FOR ADDRESSING A MAINTENANCE STATE OF A DATA CENTER (DC) DEVICE

304 — APPLY NATURAL LANGUAGE PROCESSING TO THE INSTRUCTION DATA

306 — IDENTIFY AND EXTRACT IMPERATIVE STATEMENTS IN INSTRUCTION DATA

308 — IDENTIFY DC DEVICE COMPONENTS IN EXTRACTED IMPERATIVE STATEMENTS

310 — IDENTIFY MISSING ENTITIES MENTIONED IN EXTRACTED IMPERATIVE STATEMENTS

312 — MAP LOCATION OF DC DEVICE COMPONENTS TO PHYSICAL LAYOUT OF DC DEVICE

314 — GENERATE GUIDANCE DATA FOR MAINTENANCE STATE

END

START

402 — RECEIVE FEEDBACK FROM USER OF AR DEVICE AFTER PERFORMING MAINTENANCE

404 — COMPARE FEEDBACK TO GUIDANCE DATA AND DC DEVICE DATA

406 — UPDATE GUIDANCE DATA BASED ON FEEDBACK

END

DATA CENTER GUIDE CREATION AND COST ESTIMATION FOR AUGMENTED REALITY HEADSETS

BACKGROUND OF THE INVENTION

The present invention relates generally to the field of data center maintenance, and more particularly to creating interactive guides for use with augmented reality headsets.

Data centers are large, dedicated spaces used to house various computer systems to provide a variety of services, such as website hosting. Large swaths of devices and components are deployed to meet demand and provide flexibility in case a device or component fails. Due to the large number of devices, maintenance and inspection of the data center devices is a common task within data centers. Augmented reality headsets are typically head-mounted displays (HMDs) that a user wears. Unlike virtual reality headsets, an augmented reality headsets permits the user to see their surroundings while overlaying, or augmenting, the user's view through the HMD device with additional information.

SUMMARY

Embodiments of the present invention provide a method, system, and program product to evaluate maintenance performance in a data center. A processor provides an augmented reality device to a user performing a maintenance procedure, where the augmented reality device displays a guidance script to the user while performing the maintenance procedure. A processor determines an initial base cost associated with the maintenance procedure. A processor retrieves user activity data regarding the performance of the maintenance procedure. A processor determines an activity cost of the user performing the procedure. A processor, in response to the activity cost varying a threshold amount from the initial base cost, adjusts the initial base cost of the maintenance procedure based on the activity data of the user regarding the performance of the maintenance procedure.

BRIEF DESCRIPTION OF THE SEVERAL VIEWS OF THE DRAWINGS

FIG. 3 illustrates operational processes of a scripting program, on a computing device within the environment of FIG. 1, in accordance with an exemplary embodiment of the present invention.

DETAILED DESCRIPTION

Figure 1:
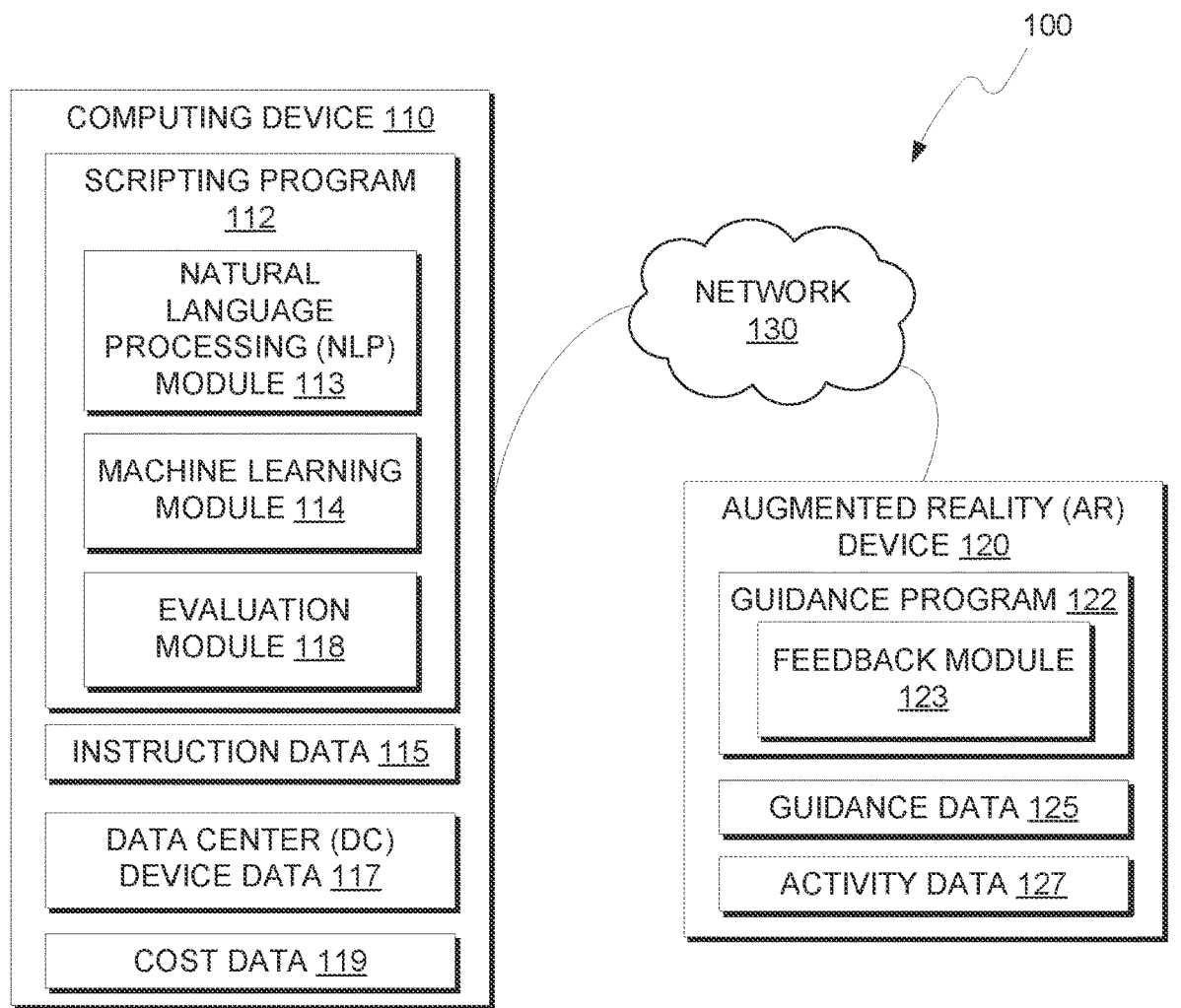
FIG. 1 is a functional block diagram illustrating a networked environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110 and augmented reality (AR) device 120 connected over network 130. Computing device 110 includes scripting program 112, natural language processing (NLP) module 113, machine learning module 114, instruction data 115, data center (DC) device data 117, evaluation module 118 and cost data 119. AR device 120 includes guidance program 122, feedback module 123, guidance data 125 and activity data 127.

In various embodiments of the present invention, computing device 110 and AR device 120 are each a computing device that can be a standalone device, a server, a laptop computer, a tablet computer, a netbook computer, a personal computer (PC), or a desktop computer. In another embodiment, computing device 110 or AR device 120 represents a computing system utilizing clustered computers and components to act as a single pool of seamless resources. In general, computing device 110 or AR device 120 can be any computing device or a combination of devices with access to instruction data 115, data center (DC) device data 117, guidance data 125, cost data 119 and activity data 127 and is capable of executing scripting program 112, NLP module 113, machine learning module 114, guidance program 122, feedback module 123 and evaluation module 118. Computing device 110 and AR device 120 may include internal and external hardware components, as depicted and described in further detail with respect to FIG. 5.

In this exemplary embodiment, scripting program 112, NLP module 113, machine learning module 114, instruction data 115, DC device data 117, evaluation module 118 and cost data 119 are stored on computing device 110; and guidance program 122, feedback module 123 and guidance data 125 are stored on AR device 120. However, in other embodiments, scripting program 112, NLP module 113, machine learning module 114, instruction data 115, DC device data 117, guidance program 122, feedback module 123 guidance data 125, evaluation module 118 and cost data 119 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and AR device 120, in accordance with a desired embodiment of the present invention.

In various embodiments, augmented reality (AR) device 120 is worn, or otherwise utilized, by a user in a data center. Data center, as used herein, is any building, location or structure that houses various computing systems for a variety of purposes, such as website hosting, data storage or providing on-demand services and/or platforms. One of ordinary skill in the art will appreciate, based on the discussion contained herein, that embodiments of the present invention may be utilized in other production or industrial environments without deviating from the invention. While wearing AR device 120, the user may move around the data center while viewing various devices in the data center.

In various embodiments, guidance program 122 display various overlays and other visual elements onto a display or projection medium of AR device 120. The visual elements, as discussed herein, provide indications of maintenance work needed to be performed on specific devices in the data center. Additionally, the visual elements also include a visual guide to help the user perform the maintenance of the specific device in the data center that needs maintenance. As discussed herein, AR device 120 is any device that augments or changes a user's real-world view with one or more visual elements. For example, AR device 120 may be a set of AR glasses or AR googles that are worn by the users that have transparent lenses. AR device 120 also includes a small projector to project images onto the lenses, creating an enhanced or augmented view of the user's surroundings. While the following is discussed regarding an augmented reality device which augments a user's view of their surroundings, AR device 120 may also be a mixed reality device. Mixed reality devices include displays and cameras, with the cameras acting as the user's "eyes", recording the user's surroundings, and recreating the user's view on a head mounted display, similar to a virtual reality device. Where an alert or guidance is displayed as an overlay on an augmented reality device, guidance program 122 would instead embed the alert or guidance into the head mounted display output of the mixed reality device.

In various embodiments, scripting program 112 digests non-structured text data from instruction data 115 to generate guidance data 125. Instruction data 115 is non-structured text that includes the steps necessary to perform a maintenance routine for a data center device or component. For example, a provider of a storage array utilized in the data center has provided text instructions to service storage disks housed within the array. As another example, a power distribution unit that supplies power to a rack or enclosure in the data center includes instructions for troubleshooting various warnings or issues. In both examples, instruction data 115 includes various text-based steps to be performed regarding specific maintenance issues that may arise with any device or component used within the data center.

In various embodiments, scripting program 112 includes a natural language processing (NLP) module 113. While digesting instruction data 115 for various devices and components used in the data center, scripting program 112 utilizes NLP module 113 to determine and extract instructive statements from instruction data 115. As previously stated, instruction data 115 are non-structured text documents, which are comprised of text without any embeddings or other computer readable syntax that denote meaning or placement. For example, a structured text document would be a comma-separated-value (CSV) file for a data table; where an unstructured text document would be an image of the table itself.

In various embodiments, NLP module 113 extracts instructive statements from instruction data 115 identifying imperative statements contained in instruction data 115. Since imperative statements are typically associated with steps to be performed during the test and not a result (e.g., "Run Diagnostics" or "Check that ETH0 on the switch is connected to terminal device"). Imperative sentences are commands or instructions that tell what someone should do. NLP module 113 identifies imperative statements based on a lack of a main subject in the sentence (e.g., "Run Diagnostics" where the subject is implied as the user and not stated) and only includes objects (e.g., "terminal device" and the "ETH0" switch port) to which the action is applied to, which is typical of troubleshooting and maintenance.

In various embodiments, data center (DC) device data 117 includes information regarding each device and component that is in use or otherwise used in operations within the data center. DC device data 117 includes physical layouts of each device including locations of ports, readouts and any other input or output of the devices or components. Additionally, DC device data 117 includes any on-site configuration of racks or enclosures used in the data center. Each rack or enclosure may have a variety of devices and components housed within. DC device data 117 includes data indicative of the which devices are in each enclosure, as well as the device's location and orientation within the enclosure. As discussed herein, DC device data 117 is utilized by scripting program 112 to develop AR device 120 guidance data 125 such that guidance program 122 is capable of identifying and highlighting or emphasizing the I/O and other interfaces of the DC devices.

In various embodiments, scripting program 112 generates guidance data 125 based on the extracted instructions of instruction data 115 and the layout and orientation of data center devices indicated in DC device data 117. For each type of maintenance or troubleshooting procedure indicated in instruction data 115, scripting program 112 generates an AR guide that includes a list of tasks or steps to perform the procedure that is extracted from instruction data 115. For each step, the objects or subjects extracted are compared to DC device data 117 to determine the location of each port, I/O, or interface on the device. Guidance data 125 includes various procedures generated from extracting instructions in instruction data 115 for a variety of maintenance procedures that may be performed for any DC device. Additionally, for each step in the procedure, guidance data 125 includes data utilized to determine the location of parts or interfaces used in the procedure. As depicted in FIG. 1, guidance data 125 resides on AR device 120. In other embodiments, guidance program 122 of AR device 120 may retrieve guidance data 125 for a specific procedure when performed on computing device 110 or another device (not shown) connected to network 130.

Once guidance data 125 is generated for a procedure, AR device 120 is capable of assisting a user to perform the procedure. In some scenarios, a user may be on the operational floor of the data center. Guidance program 122 may then receive any alerts or maintenance requests regarding issues or work needed to be done for a DC device. As the user approaches the device, guidance program 122 monitors the location and view of the user. Once the device is within a certain distance of the user, guidance program 122 starts the relevant guide in guidance data 125 for the procedure. For each step in the procedure, guidance program 122 identifies the relevant ports, interfaces, components, and the like of the DC device and highlights the interfaces relevant for each step, while also displaying the instructive statements extracted from instruction data 115 by NLP module 113. As the user performs the procedure and advances through each step, guidance program 122 displays the text for the next step and highlights any relevant interface to the current step.

In various embodiments, scripting program 112 determines the location of interfaces on a DC device based on machine vision applied by guidance program 122 while a user is viewing or servicing the DC device. AR device 120 includes one or more cameras that capture to view or surrounding of the user. Guidance data 125 includes schematics, diagrams or other types of images that indicate the layout and interfaces of a DC device. By comparing the captured images of the device to known schematics, guidance program 122 can identify and highlight or otherwise emphasize to the user which port or interface is used in a particular step of the maintenance procedure. As guidance program 122 executes guidance data 125 for a particular procedure, guidance program 122 identifies the relevant interfaces for each step and highlights or otherwise emphasize to the user the location of the interface.

In various embodiments, feedback module 123 receives feedback from the user after or during a maintenance procedure. Guidance program 122 sends the feedback to machine learning module 114. Based on the type of feedback, machine learning module 114 updates guidance data 125 provided to users of AR device 120 for similar procedures. Feedback module 123 sends the feedback to machine learning module 114 along with other relevant information such as the rack, enclosure, location, and device related to the specific maintenance that was performed. For example, a user provides feedback that the incorrect port was highlighted during a step of a procedure to feedback module 123. Machine learning module 114 identifies the port correction in the feedback. Then machine learning module 114 updates guidance data 125 such that the particular step states the correct port. Also, machine learning module 114 updates DC device data 117 such that guidance program 122 of AR device 120 will correctly point to the correct relative location of the new port. In some embodiments, machine learning module 114 collects more than one feedback from users of AR device 120 during various procedures previously performed. Machine learning module 114 collates the feedback to identify common changes or mistakes in guidance data 125 as indicated by the various feedback.

In various embodiments, scripting program 112 includes evaluation module 118. Evaluation module 118 generates a cost or billing amount associated with a procedure that was performed by a user. As maintenance is performed, AR device 120 records activity data 127 which stores the steps the user performed in the procedure as well as the length or time spent on each step performed in the procedure. Additionally, activity data 127 includes any messages, remarks or annotations made by the user during the procedure which are associated with a step or task in the procedure. Furthermore, attributes of the user performing the maintenance procedure are also recorded in activity data 127 such as identifying information regarding the user (e.g., identification number or name), skill or expertise level (e.g., Tech I or Tech II; less than 2 years of service or greater than 5 years of service), shift or timeslot task was performed, time spent on each task, any overages or overtime incurred during each task, and any damages or repairs that resulted from the procedure.

In various embodiments, evaluation module 118 retrieves activity data 127 once a user has completed a procedure in the data center. In some scenarios, evaluation module 118 may analyze activity data 127 in real-time or as component tasks of a procedure are completed. Once a task or procedure is completed, evaluation module 118 determines a cost charged or bill for in regards to the task or procedure performed. Cost data 119 includes various rate cards which breakdown pricing and billing for tasks and procedures. Each rate card includes billing and invoice rates for typical tasks that may be performed during procedures. Additionally, each rate card may have adjustments for rates based on a variety of factors including, but not limited to, geographic-specific or location-specific rates, currency conversion adjustments, government and/or institutional policies, and applicable other billing and rate agreements associated with a customer's service contract with the data center.

In various embodiments, evaluation module 118 evaluates activity data 127 to determines the tasks performed by a user as well as the time spent on each task. Evaluation module 118 then retrieves cost data 119 to determine the applicable rates to apply to the various task of the procedure. First, evaluation module 118 determines if overages were incurred during the procedure. For any task that exceeds the time allotted to a task, evaluation module 118 records the discrepancy. If enough procedures report a task or type of task has constant or frequent overages (e.g., the task takes significantly longer than expected), then evaluation module 118 may increase the expected time to complete the task, thereby increasing the billing amount of future invoices. Similarly, if a task is completed quicker than normal, then evaluation module 118 may decrease the expected time to complete the task, thereby decreasing the billing amount of future invoices.

Once a base rate is retrieved and, if indicated by activity data 127, adjusted, evaluation module 118 generates an initial billing amount by multiplying the adjusted billing rate for each task by the time spent on each task. In various embodiments, evaluation module 118 adjusts the initial billing amount based on a variety of factors represented by both activity data 127 and cost data 119. Evaluation module 118 may adjust the initial billing amount based on or more of the following factors: expertise adjustments (i.e., adjusted based on the expertise level of the user who performed a task), shift or time-of-day adjustments (i.e., adjustments based on the time the task was performed, such as during peak maintenance or high usage windows), complexity adjustments (i.e., adjustments due to complications or other delays due to specific issues with a procedure), overtime adjustments (i.e., adjustments due to wage or salary costs due to timing of procedure), engagement adjustments (i.e., administrative or non-maintenance work incurred by a customer), damages adjustments (i.e., adjustments due to damaged equipment that needs replaced), or any variable costs that may occur during the procedure. Once evaluation module 118 adjusts the initial billing amount, evaluation module 118 generates a final invoice amount for the procedure.

In various embodiments, NLP module 113 may evaluate activity data 127 regarding a user's performance and notes regarding a procedure. For example, regarding complexity, engagement and damages adjustments, typically these types of adjustments are not codified and recorded in a natural language. For example, a user may note that "Step 1.B required new fuse due to electrical short". In various embodiments, when evaluating activity data 127, evaluation module 118 may invoke NLP module 113 to evaluate any text, or transcription of audio, provided by a user during a procedure. If the text for a task indicates that an additional cost was incurred, then NLP module 113 identifies the event that caused the incurred cost. In such scenarios, cost data 119 includes various rate cards and invoice data for replacements, engagements or damages that may occur during a procedure. By using natural language understanding, NLP module 113 can identify additional adjustments to a procedure without the need to directly create specific forms and nomenclature to record such adjustment. Maintenance users will be able to quickly state or transcribe the adjustment that occurred, with NLP module 113 used to determine the type of adjustment that is mentioned. In turn, evaluation module 118 can be notified of the type of adjustment and adjust the initial billing amount based on the adjustment identified by NLP module 113.

In various embodiments, evaluation module 118 also evaluates the performance of the user regarding the overall procedure as well as component tasks of the procedure. In various embodiments, evaluation module 118 provides activity data 127 of a user performance of a procedure to machine learning module 114. In various embodiments, machine learning module 114 assigns a performance score to the completed procedure, as well as the component tasks of the procedure. Based on past activity data 127 from other users who performed the same or similar procedures, machine learning module 114 determines if the user excelled or underperformed at the tasks of a procedure. In cases where a user struggled in a given task, machine learning module 114 compares the lower completion time to the expected times determined by inspecting past activity data 127, as discussed herein. Additionally, when tasks or procedures fall outside expected completion times, machine learning module 114 analyzes activity data 127 to determine a cause for the excess time spent on tasks. Based on the activity data 127 and user attributes, machine learning module 114 infers a cause for the delay. For example, if historic activity data 127 shows technicians of a certain skill level (e.g., Junior Techs) consistently exceed time allotted for a task, then machine learning module 114 annotates current and future activity data 127 with a note indicating the inferred relationship (e.g., "Junior Techs struggle with this task").

In some embodiments, machine learning module 114 evaluates the sequence of tasks in a procedure. Some procedures may have component tasks that can be completed in a different order. While certain dependent tasks require preceding tasks to be completed (i.e., install server rack must be done before installing peripherals), other tasks may be completed in parallel or in any order. For non-dependent tasks in a procedure, machine learning module 114 evaluates activity data 127 to determine if rearranging the order of non-dependent tasks improves certain aspects of the procedure. One aspect is the completion time of the procedure, where machine learning module 114 applies artificial intelligence combinatorics to determine various combinations of order for non-dependent tasks. When a sequence is found which improves completion time, machine learning module 114 updates the procedure with the new order of tasks. Another aspect that machine learning module 114 evaluates activity data 127 for improvement is performance of the task, such as minimizing reworks or re-dos of a task. Some tasks when performed in succession, such as long or complicated repairs, could lead to stress of the user, resulting in poorer performance of the overall procedure. If machine learning module 114 detects tasks in succession that overrun or have other complications, then machine learning module 114 determines if a re-arrangement of tasks in the procedure can be done (i.e., dependent tasks are kept in order, while re-arranging non-dependent tasks). Machine learning model 114 monitors future performances of the altered procedure. If performance is improved, then machine learning module 114 maintenance the change to the procedure. If performance is not improved, then machine learning module 114 attempts other suggestions of order of tasks for the procedure.

In some embodiments, evaluation module 118 evaluates activity data 127 as a procedure is being performed by a user. If the user deviates in performance for one or more tasks, evaluation module 118 detects the poor performance, as discussed herein, and suggests other users that could the procedure. By doing so, faults and other issues can be detected in real time and other more qualified technicians can be dispatched to help, or take over, a procedure. Based on the procedure, evaluation module 118 identifies users with adequate or greater experience or expertise for the procedure and reallocates the poor performing procedures being performed in a datacenter as the issues occur. In some embodiments, evaluation module 118 notifies administrator or other users in the datacenter regarding the performance of ongoing procedures in a datacenter. Evaluation module 118 notifies relevant users of completion of an activity or if the activity is taking more time than the expected or needs an expert assistance.

In various embodiments, determines if a user is compliant with a procedure. Some procedures may have additional contractual or legal compliances as required by the tenant utilizing the data center. Some tenants may require additional tasks not needed to repair or fix an item related to the procedure, but a yet important to maintain the agreement. For example, privacy portions of the tenants' agreement may require data to be encrypted prior to backup. Machine learning module 114 verifies in activity data 127 if any applicable additional requirements, rules or procedures were adhered to by the user. If a user fails to do these additional requirements, then evaluation module 118 may remark on the user's activity. If a user repeatedly fails to perform these additional requirements, then evaluation module 118 may notify other users of the repeated failure.

Figure 2:
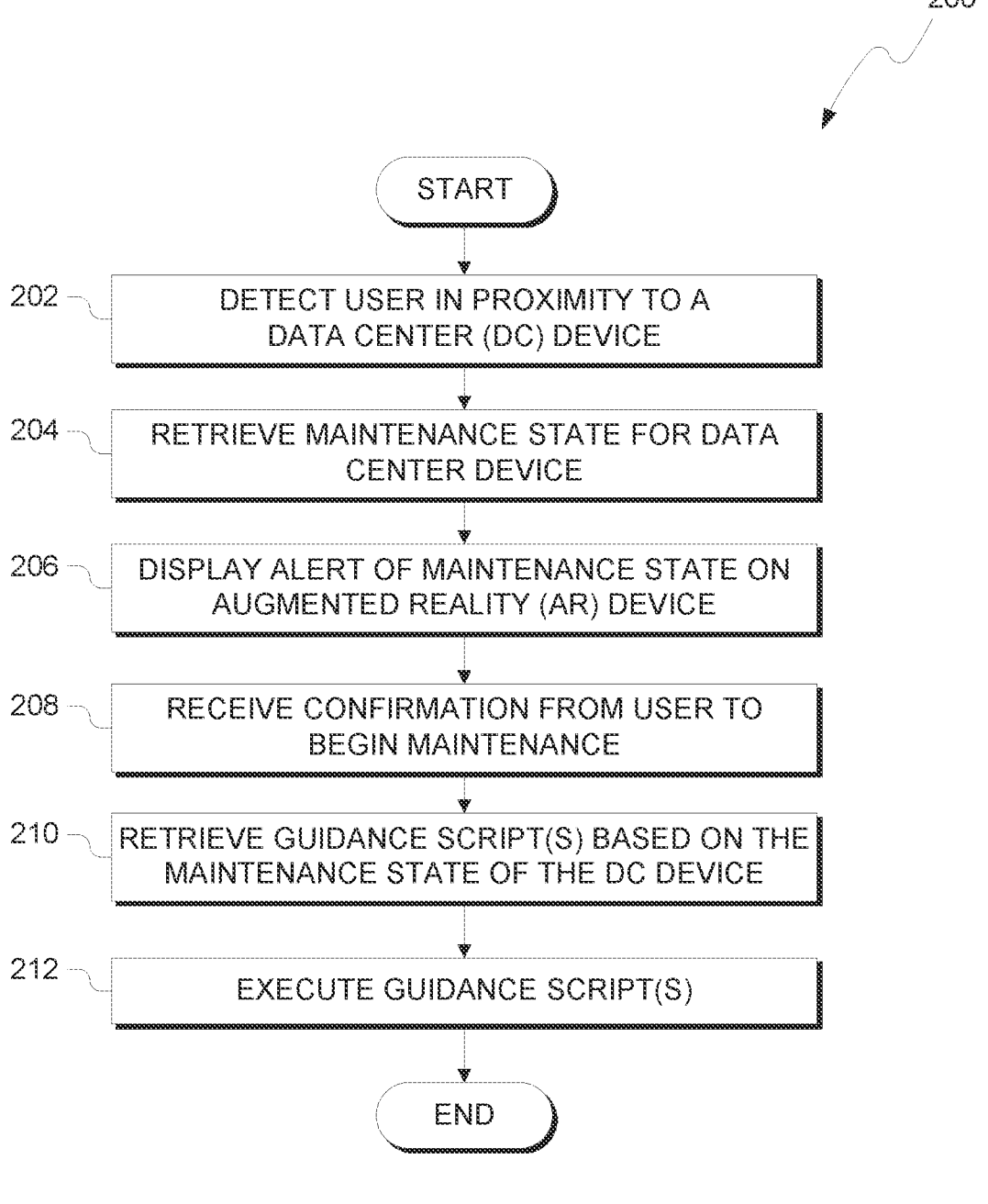
FIG. 2 illustrates operational processes of a guidance program, on a computing device within the environment of FIG. 1, in accordance with an exemplary embodiment of the present invention.

FIG. 2 illustrates operational processes, generally designated 200, of guidance program 122 on AR device 120. In process 202, guidance program 122 detects a user is in proximity to a data center (DC) device. Guidance program 122 monitors the location of the user within the data center and as the user approaches various devices in the data center, guidance program 122 retrieves the maintenance states of the nearby DC devices to the user of AR device 120 (process 204). In process 206, if a device has a pending maintenance task, error, or other service procedure, then guidance program 122 displays an alert to the user stating the procedure to be performed. In process 208, guidance program 122 receives input from the user to start the procedure. In some scenarios, the input may be a voice command or response from the user to start the procedure. In process 210, guidance program 122 retrieves and guidance scripts from guidance data 125 needed to perform the procedure based on the maintenance state of the device to be serviced.

In process 212, guidance program 122 executes the guidance scripts for the procedures to be performed. As discussed herein, guidance data 125 includes a set of steps needed to be performed that have been automatically altered by NLP module 113 to address the specific device within the data center for the procedure. While some devices may have a default operational state, many data center devices are configured in specific ways to handling subnetting and other networking issues. NLP module 113 digests manufacture provided instruction data 115, extract instructive statements from instruction data 115, and reformats the sentences to address the specific configurations of the DC device. As such, guidance program 122 provides a tailored guide that is automatically generated from generic manufacturer documentation. Additionally, guidance data 125 is enriched with DC device data 117 by NLP module 113 such that the position and location of DC devices, as well as ports and other interfaces, are used by guidance program 122 to highlight or emphasize the correct devices and interfaces used in each step of the procedure.

FIG. 3 illustrates operational processes, generally designated 300, of scripting program 112. In process 302, scripting program 112 retrieves instruction data 115 related to a procedure or task to address a maintenance state of a DC device. In process 304, scripting program 112 applies natural language processing via NLP module 113 to instruction data 115. As discussed herein, instruction data 115 is non-structured text typically provided by a provider or manufacturer of the DC device.

In process 306, NLP module 113 of scripting program 112 identifies and extracts imperative statements from instruction data 115. For example, NLP module 113 deploys parts-of-speech (POS) tagging to determine if the sentence is an imperative statement. POS tagging tokenizes strings of text from instruction data 115 and assigns a token to each word indicating the "part-of-speech" the words are within the structure of the sentence. Typically, imperative statements are instructive and lack as main subject ("Set gateway address to 192.168.0.1"). If the POS tagging indicates such a sentence structure, scripting program 112 extracts the sentence from instruction data 115 to be included as a step in guidance data 125, after the following processes.

In process 308, scripting program 112 identifies the objects in the extracted sentences and compares the objects to DC device data 117. DC device data 117 includes schematics or other models that indicate the size and layout of various inputs, outputs, interfaces, and other connections of the DC device. When scripting program 112 identifies that a step mentions a part or other component of the device, scripting program 112 retrieves the schematics and models of the device to determine a location of the part on the device. Once identified, scripting program 112 embeds within the generated guidance data 125 data indicative of the location of the parts on the DC device, such that when a user follows guidance data 125, for a particular procedure, guidance program 122 highlights or emphasizes the part relevant to each step of the procedure as the procedure is being performed.

In some scenarios, either due to incorrect documentation or conflicting names and identifiers used between instruction data 115 and DC device data 117, scripting program 112 may not be able to identify entities mentioned in instruction data 115 within DC device data 117 (process 310). In such scenarios, scripting program 112 creates a notification or alert to instruct a developer or other user to update DC device data 117 to indicate the location of the missing entities.

In process 312, scripting program 112 maps the location of components of the DC device to a location on a physical instance of the device. In some scenarios, based on the type of detection used by AR device 120, scripting program 112 generates a mapping of the location of the component within DC device's enclosure. For example, AR device 120 utilizes machine vision to determine the DC devices within a user's view. In this example, scripting program 112 generates images to use in the machine vison process with embeddings indicating where each component is located within the images. In process 314, scripting program 112 generates guidance data 125 for the procedure. Guidance data 125 includes the extract imperative statements along with locational embedding of components utilized in each step of the procedure.

Figure 4:
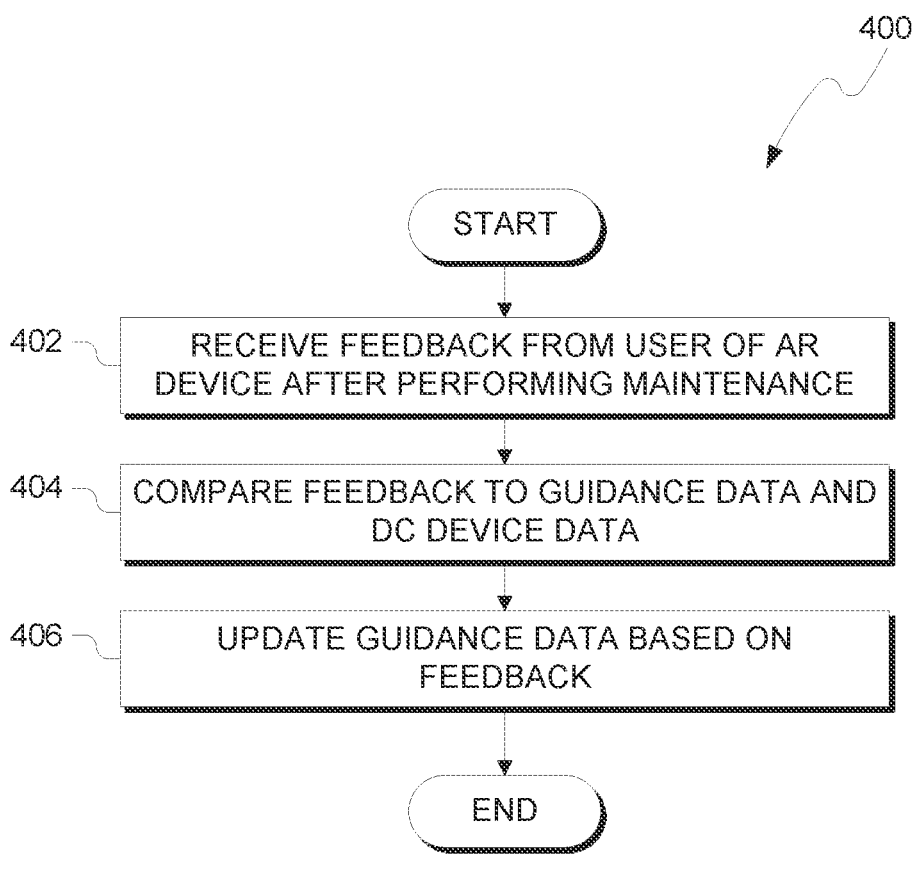
FIG. 4 illustrates operational processes of a machine learning module, on a computing device within the environment of FIG. 1, in accordance with an exemplary embodiment of the present invention.

FIG. 4 illustrates operational processes, generally designated 400, of machine learning module 114 of scripting program 112. In process 402, machine learning module 114 receives feedback from a user of AR device 120. The user of AR device 120 provides feedback regarding a specific guide in guidance data 125 related to a maintenance procedure the user has performed. In some scenarios, the user provides feedback while performing the procedure. In various embodiments, feedback module 123 of guidance program 122 receives feedback from a user regarding corrections or other changes the user believe should be made for the procedure. For example, a DC device may have a specific configuration that is not part of instruction data 115 that was provided by a manufacturer of the DC device. Network configurations, such as gateways, proxies and the like, may be unique not only for the data center but for each device. The user can provide feedback to feedback module 123 to indicate these custom configurations that need to be updated in guidance data 125. In other scenarios, the feedback may correct or change the text contained in guidance data 125. If a guide erroneously states the wrong interface or is otherwise providing an incorrect step in the procedure, the user can provide feedback regarding the incorrect step.

In process 404, machine learning module 114 compares the received feedback to the configurations for the DC device or corrections to the steps of a given procedure. In process 406, if the feedback changes any configurations or has corrections, then machine learning module 114 updates guidance data 125 accordingly. In some embodiments, machine learning module 114 alter guidance data 125 based on preferences or other suggestions of each user of AR device 120. For example, one user may provide suggestions regarding the interface names suggesting the change of "ETH0" to "Port 0". For stylistic or preferential changes, machine learning module 114 alters only guidance data 125 delivered to the user who changed guidance data 125 based on preference. If machine learning module 114 identifies a common change among users, then machine learning module 114 updates guidance data 125 for new users to include the preferential change of other users. This way current techs and users can train guidance data 125 to their liking, while new users can gain the benefit of frequent or common changes made by other users.

Figure 5A:
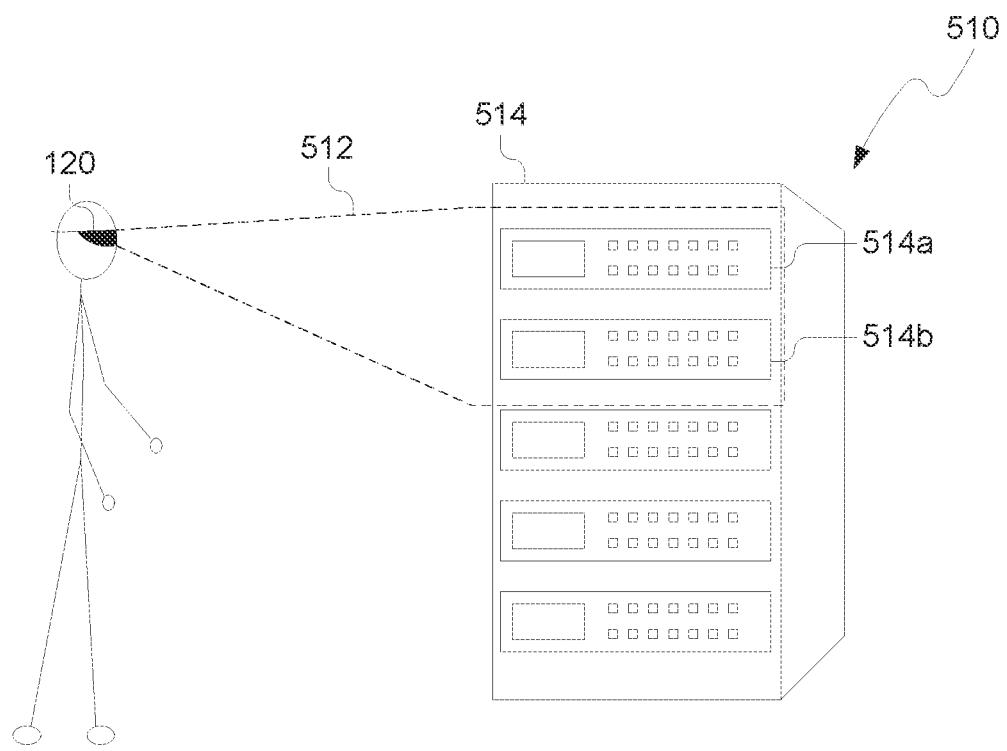
FIGS. 5A and 5B depict example visualizations of a user utilizing an augmented reality device, in accordance with an exemplary embodiment of the present invention.
Figure 5B:
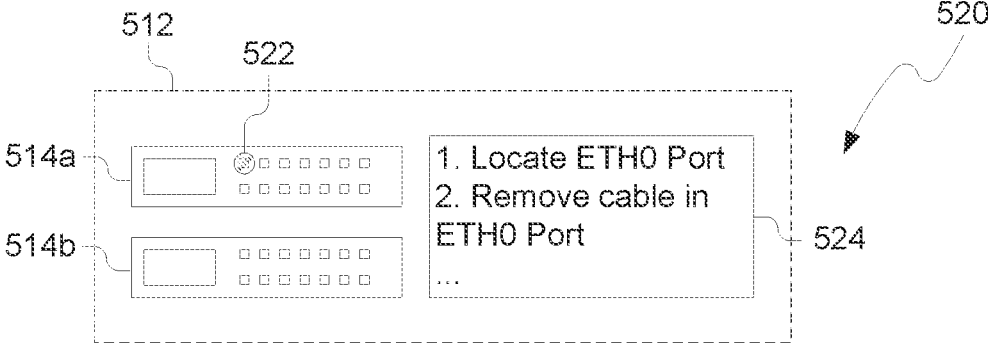

FIGS. 5A and 5B depict visualizations, designated 510 and 520 respectively, of a user of AR device 120 performing a maintenance procedure. FIG. 5A depicts visualization 510 of a user of AR device 120 viewing DC device 514. In this example, components 514a and 514b are in the user's view 512, of which the user's view can be augmented by AR device 120 of components 514a and 514b, as depicted in FIG. 5B. FIG. 5B depicts visualization 520 of user's view 512. In this example, component 514a of DC device 514 requires maintenance. Once the user approaches the DC device and guidance program 122 identifies the DC device is within the user's view, guidance program 122 generates highlight 522 and guide 524 as an overlay of AR device 120 such that the user see's visualization 520 that includes real world components 514a and 514b as well as the augmented visual overlays on AR device 120 of highlight 522 and guide 524. As the user follows guidance data 125, guide 524 displays the steps of the procedure to be performed. Additionally, guidance program 122 generates highlight 522 of any interface, device, component or the like involved with each step. In this example, the "ETH0" port is involved in the current steps of the procedure. As such, guidance program 122 identifies the location of the port via machine vision, as discussed herein, and highlights or otherwise brings attention to the interface to the user via highlight 522.

Figure 6A:
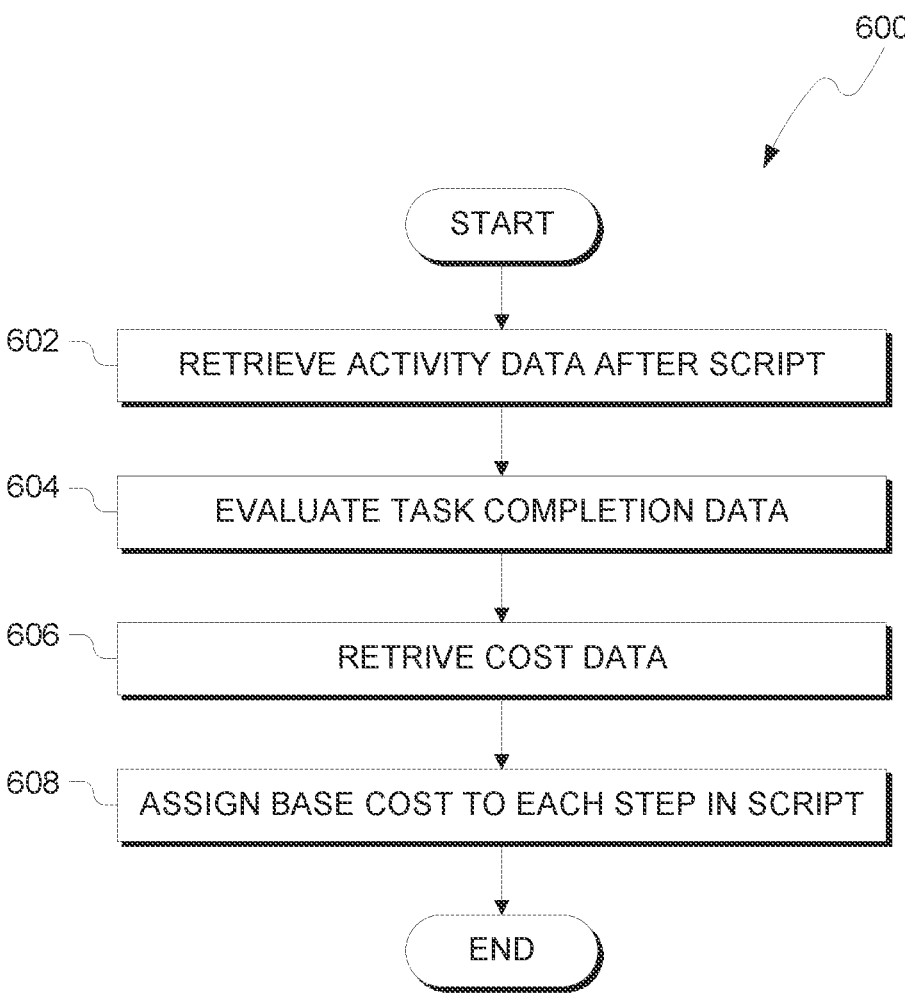
FIGS. 6A and 6B illustrate operational processes of an invoice module, on a computing device within the environment of FIG. 1, in accordance with an exemplary embodiment of the present invention.

FIG. 6A illustrates operational processes, generally designated 600, of scripting program 112 determining cost associated with performance of a guidance script. In process 602, scripting program 112 retrieves activity data 127 from AR device 120 once a procedure, or at least one task of the procedure is completed. As discussed herein, when a user performs a procedure, scripting program 112 generates an invoice for the procedure. Activity data 127 indicates which tasks of the procedure have been completed, the completion times of the tasks, and user information such as name or other identifier, expertise, or position at the data center. In process 604, scripting program 112 evaluates the task completion data from activity data 127. When initially determining the base costs of steps or tasks in a procedure script, scripting program 112 extracts the time each task takes for the user, as well as the expertise of the user. Based on the experience of the user, scripting program 112 determines expected completion times for task for the various skill or expertise levels of users.

In process 606, scripting program 112 retrieves an initial base cost for a task or procedure. In some scenarios, the initial base cost is based on pre-determined rate cards from other similar data centers or other operations based on the type of operation being evaluated. In other scenarios, the rate cards are pre-populated with a base cost. Cost data 119 maintains a corpus of prices (rate card) based on different types of services, geographies, currency, government and corporate policies, devices supported, support contract. Evaluation module 118 considers these above attributes along with performance, shift and tasks executed. Evaluation module 118 predicts the overall cost for the services provided by the user of AR device 120. The predicted cost is based on the accumulated cost of a variety of factors, including, but not limited to, total service hours to complete procedure, labor cost of the user performing the procedure, expertise level of the user, shift or escalation costs, extra credits for resolving complex problems (i.e., currency conversions), potential overtime or overruns, engagement deductions, potential damages or repairs to be incurred, and any other variable cost attributed to the procedure. In process 608, scripting program 112 assigns a base cost to each step in a procedure. Scripting program 112 adjusts the initial base cost based on the task completion data from activity data 127. For the various expertise levels tracked, scripting program 112 assigns the initial base cost to each level. Then, based on the completion time, scripting program 112 adjusts the base cost to reflect the total cost for each group (e.g., base cost per hour multiplied by the hours to complete task per expertise grouping).

In some embodiments, NLP module 113 inspects various notes made by users during maintenance procedures. If NLP module 113 determines that the notes indicate difficulty or issues when performing a procedure, then scripting program 112 may increase the base cost. For example, if multiple user's activity data 127 indicates that a step required reworks or additional parts, as detected by NLP module 113, then scripting program 112 may increase or otherwise adjust the base cost for the step based on the indicated complications gleamed by natural language understanding provided by NLP module 113. During assignment of procedures, scripting program 112 predicts the total potential cost for the procedure to be done, for a given maintenance worker, for a given timeframe or shift, and a given level of expertise. If the cost exceeds a threshold amount, scripting program 112 determines alternative workers or maintenance windows to assign and perform the procedure such that the overall cost is lowered.

Figure 6B:
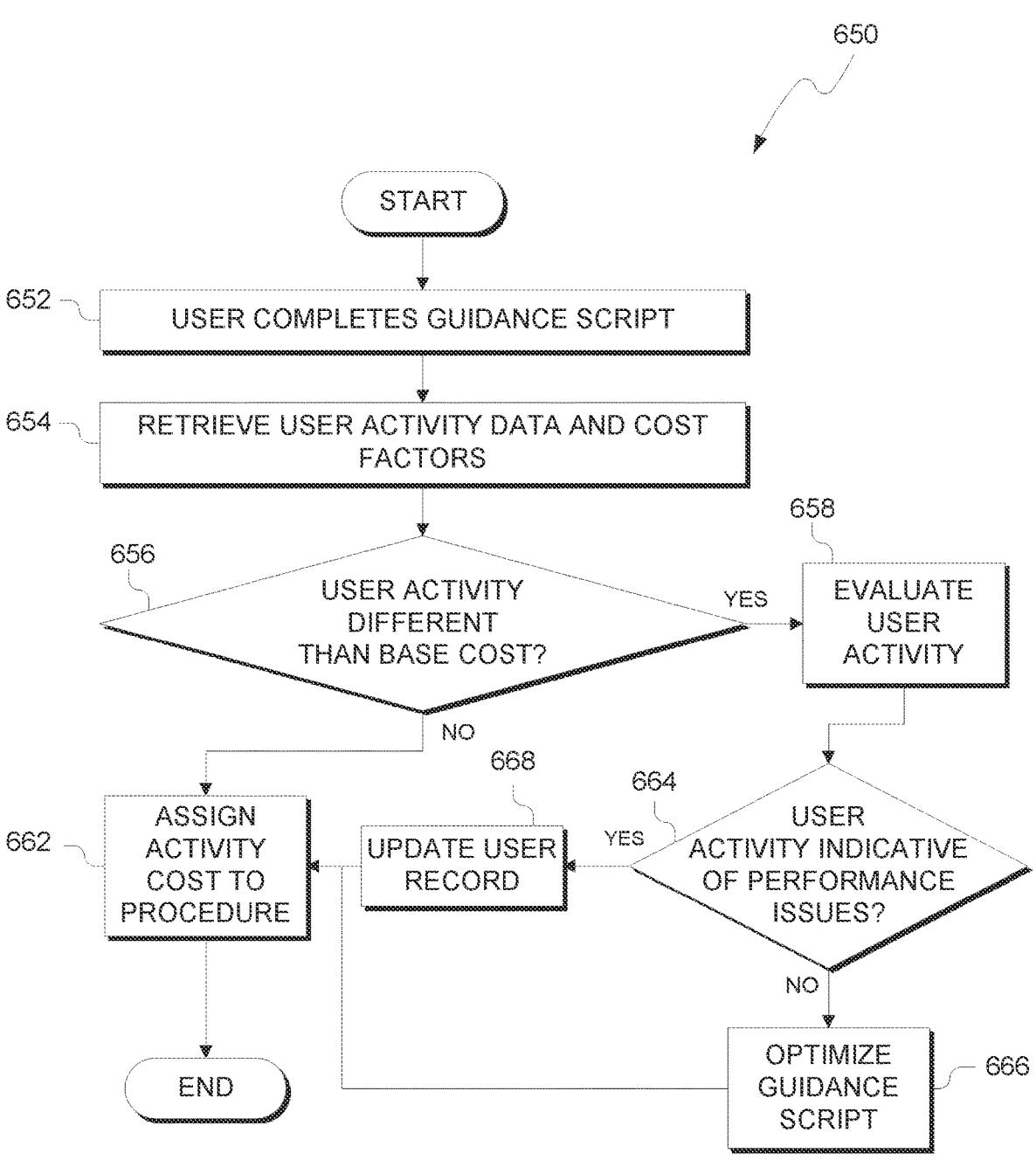

FIG. 6B illustrates operational processes, generally designated 650, of scripting program 112 evaluating a completed procedure. In process 652, a user has completed a maintenance procedure's guidance script. In various embodiments, as discussed herein, AR device 120 provide the script and tracks the user's performance during the procedure as activity data 127. In process 654, once the user completes the procedure, or a task in the procedure, scripting program 112 retrieves the user's activity data 127 for the procedure or task as well as the user's cost factors. Cost factors are factors in that vary cost the rate cards of cost data 119. Example cost factors include, the user's skill or expertise, the time of day or shift, along with any additional work that may have occurred due to overtime, customer engagement or support, or repairs/replacements that need to be done in addition to the tasks of the procedure.

In decision process 656, scripting program 112 compares user activity data 127 and the various cost factors of the user to the base cost of the procedure or task initially determined in process 608. If the user's total invoice amount adjusted based on cost factors is significantly different that the initial base cost (YES branch), then scripting program 112 evaluates the user's activity data 127 (process 658). In process 658, scripting program 112 identifies any indicators in activity data 127 that may be the cause, or otherwise indicative, of the variance in activity data 127 and the base cost of the task or procedure. In decision process 664, if the user's activity data 127 indicates performance issues with the task or procedure (YES Branch), then scripting program updates the user's record to indicate the poor performance (process 668). For example, if the user's activity data 127 and cost factors fall outside a reasonable margin of error of the base cost (e.g., +/−5% of base cost), then scripting program 112 determines the variance is due to the performance of the procedure by the user and updates the user's record accordingly.

If the user's activity data 127 does not indicate poor performance (NO branch of decision process 664), then scripting program 112 sends the activity data 127 of the procedure to machine learning module 114 to optimize the guidance script based on the new data (process 666). As discussed herein, machine learning module 114 evaluates and is trained on activity data 127. Based on activity data 127 collected across similar procedures, machine learning module 114 determines if any changes to the guidance script may result in better performance. For example, as discussed herein, machine learning module 114 may test out different ordering or combinations of non-dependent tasks in the procedure, evaluate the new order and determine if improvements to the procedure can be achieved.

In process 662, scripting program 112 assigns the activity cost to the procedure which based on the variance of the initial value from the cost base could result in a re-evaluation of the base cost to align with activity data 127. In scenarios where user activity varies significantly from the base cost (YES branch of decision process 656), in some embodiments, scripting program 112 assigns the original cost based on user activity. In other embodiments, if the user activity varies from the base cost, scripting program 112 may adjust the activity cost. For example, if reworks or prolonged repairs occur, then scripting program 112 may adjust the original cost. In some embodiments, if user activity varies greatly from the base cost (e.g., more than 10% versus the 5% cutoff in the example regarding process 664), then scripting program 112 may mark the procedure for additional review. Some variances may be outside the user's control and may be based on external factors, such as lacking parts for repairs. As such, scripting program 112 may want to exclude the data for training and analysis via machine learning module 114, since the activity may be an outlier. In such scenarios, scripting program 112 may alert other user's of the great variance in base cost, permitting the users to handle training and use of machine learning module 114.

Figure 7:
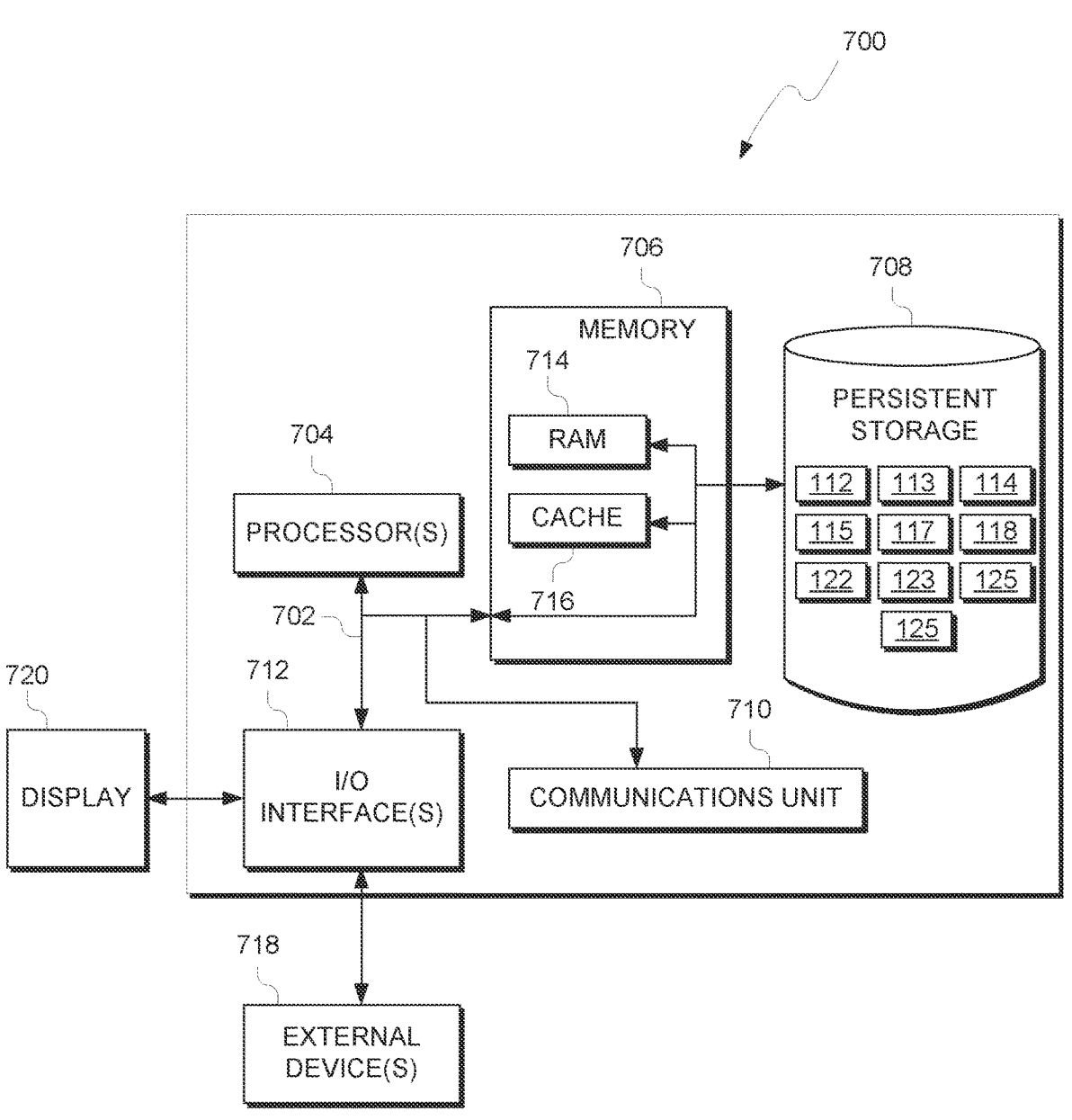
FIG. 7 depicts a block diagram of components of the computing device executing scripting program and a guidance program, in accordance with an exemplary embodiment of the present invention.

FIG. 7 depicts a block diagram, 700, of components of computing device 110 and AR device 120, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 and AR device 120 each includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Scripting program 112, NLP module 113, machine learning module 114, instruction data 115, DC device data 117, guidance program 122, feedback module 123, guidance data 125 evaluation module 118, cost data 119 and activity data 127 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 130. In these examples, communications unit 710 includes one or more network interface cards. Communications unit 710 may provide communications through the use of either or both physical and wireless communications links. Scripting program 112, NLP module 113, machine learning module 114, instruction data 115, DC device data 117, guidance program 122, feedback module 123, guidance data 125, evaluation module 118, cost data 119 and activity data 127 may be downloaded to persistent storage 708 through communications unit 710.

I/O interface(s) 712 allows for input and output of data with other devices that may be connected to computing device 110 and AR device 120. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., scripting program 112, NLP module 113, machine learning module 114, instruction data 115, DC device data 117, guidance program 122, feedback module 123 guidance data 125, evaluation module 118, cost data 119 and activity data 127, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:

causing, by one or more processors, an augmented reality device to guide a user through performing a maintenance procedure to a device, wherein the augmented reality device displays: (i) a step of the maintenance procedure and (ii) an overlay highlighting an area of the device corresponding to the step of the maintenance procedure, to the user while performing the maintenance procedure;

determining, by one or more processors, an initial base cost associated with the maintenance procedure;

monitoring, by one or more processors, user activity data, in real time, regarding performance of the maintenance procedure, the user activity data including a length of time to complete the step of the maintenance procedure;

receiving, by one or more processors, feedback from the user indicating that the overlay highlighting the area of the device corresponding to the step of the maintenance procedure is incorrectly located;

collating, by one or more processors, the feedback from the user with additional feedback, wherein the additional feedback also indicates that the overlay highlighting the area of the device corresponding to the step of the maintenance procedure is incorrectly located;

determining, by one or more processors, a correct position for the overlay utilizing a machine learning algorithm;

responsive to the feedback and the additional feedback, changing, by one or more processors, a position of the overlay to the correct position;

determining, by one or more processors, an activity cost of the user performing the maintenance procedure; and responsive to the activity cost varying above a threshold amount from the initial base cost, automatically adjusting, by one or more processors, the initial base cost of the maintenance procedure based on the user activity data regarding the performance of the maintenance procedure.

2. The computer-implemented method of claim 1, wherein the activity cost is determined based on a machine learning algorithm.

3. The computer-implemented method of claim 2, wherein the machine learning algorithm is trained based on additional activity data from other performances of the maintenance procedure.

4. The computer-implemented method of claim 3, the computer-implemented method further comprising:

evaluating, by one or more processors, the maintenance procedure with the machine learning algorithm; and determining, by one or more processors, a new order of tasks for the maintenance procedure based on the evaluation of the maintenance procedure by the machine learning algorithm.

5. The computer-implemented method of claim 3, the computer-implemented method further comprising:

evaluating, by one or more processors, ongoing activity data with the machine learning algorithm, wherein the ongoing activity data is gathered from an ongoing maintenance procedure; and responsive to the ongoing activity data indicating variance from an expected cost of the ongoing maintenance procedure, identifying, by one or more processors, a new user to perform the ongoing maintenance procedure.

6. The computer-implemented method of claim 3, wherein the machine learning algorithm is trained to minimize time spent performing the maintenance procedure.

7. The computer-implemented method of claim 3, wherein the machine learning algorithm is trained to maximize compliance to requirements of the maintenance procedure.

8. A computer program product comprising:

one or more computer-readable storage devices; and program instructions stored on the one or more computer-readable storage devices to perform operations comprising:

causing an augmented reality device to guide a user through performing a maintenance procedure to a device, wherein the augmented reality device displays: (i) a step of the maintenance procedure and (ii) an overlay highlighting an area of the device corresponding to the step of the maintenance procedure, to the user while performing the maintenance procedure;

determining an initial base cost associated with the maintenance procedure;

monitoring user activity data, in real time, regarding performance of the maintenance procedure, the user activity data including a length of time to complete the step of the maintenance procedure;

receiving feedback from the user indicating that the overlay highlighting the area of the device corresponding to the step of the maintenance procedure is incorrectly located;

collating the feedback from the user with additional feedback, wherein the additional feedback also indicates that the overlay highlighting the area of the device corresponding to the step of the maintenance procedure is incorrectly located;

determining a correct position for the overlay utilizing a machine learning algorithm;

responsive to the feedback and the additional feedback, changing a position of the overlay to the correct position;

determining an activity cost of the user performing the maintenance procedure; and responsive to the activity cost varying above a threshold amount from the initial base cost, automatically adjusting the initial base cost of the maintenance procedure based on the user activity data regarding the performance of the maintenance procedure.

9. The computer program product of claim 8, wherein the activity cost is determined based on a machine learning algorithm.

10. The computer program product of claim 9, wherein the machine learning algorithm is trained based on additional activity data from other performances of the maintenance procedure.

11. The computer program product of claim 10, wherein the operations further comprise:

evaluating the maintenance procedure with the machine learning algorithm; and determining a new order of tasks for the maintenance procedure based on the evaluation of the maintenance procedure by the machine learning algorithm.

12. The computer program product of claim 10, wherein the operations further comprise:

evaluating ongoing activity data with the machine learning algorithm, wherein the ongoing activity data is gathered from an ongoing maintenance procedure; and responsive to the ongoing activity data indicating variance from an expected cost of the ongoing maintenance procedure, identifying a new user to perform the ongoing maintenance procedure.

13. A computer system comprising:

a processor set;

one or more computer readable storage media; and program instructions stored on the one or more computer readable storage media to cause the processor set to perform operations comprising:

causing an augmented reality device to guide a user through performing a maintenance procedure to a device, wherein the augmented reality device displays: (i) a step of the maintenance procedure and (ii) an overlay highlighting an area of the device corresponding to the step of the maintenance procedure, to the user while performing the maintenance procedure;

determining an initial base cost associated with the maintenance procedure;

monitoring user activity data, in real time, regarding performance of the maintenance procedure, the user activity data including a length of time to complete the step of the maintenance procedure;

receiving feedback from the user indicating that the overlay highlighting the area of the device corresponding to the step of the maintenance procedure is incorrectly located;

collating the feedback from the user with additional feedback, wherein the additional feedback also indicates that the overlay highlighting the area of the device corresponding to the step of the maintenance procedure is incorrectly located;

determining a correct position for the overlay utilizing a machine learning algorithm;

responsive to the feedback and the additional feedback, changing a position of the overlay to the correct position;

determining an activity cost of the user performing the maintenance procedure; and responsive to the activity cost varying above a threshold amount from the initial base cost, automatically adjusting the initial base cost of the maintenance procedure based on the user activity data regarding the performance of the maintenance procedure.

14. The computer system of claim 13, wherein the activity cost is determined based on a machine learning algorithm.

15. The computer system of claim 14, wherein the machine learning algorithm is trained based on additional activity data from other performances of the maintenance procedure.

16. The computer system of claim 15, wherein the operations further comprise:

evaluating the maintenance procedure with the machine learning algorithm; and determining a new order of tasks for the maintenance procedure based on the evaluation of the maintenance procedure by the machine learning algorithm.

17. The computer system of claim 15, wherein the operations further comprise:

evaluating ongoing activity data with the machine learning algorithm, wherein the ongoing activity data is gathered from an ongoing maintenance procedure; and responsive to the ongoing activity data indicating variance from an expected cost of the ongoing maintenance procedure, identifying a new user to perform the ongoing maintenance procedure.

18. The computer system of claim 15, wherein the machine learning algorithm is trained to minimize time spent of the maintenance procedure.

19. The computer-implemented method of claim 1, further comprising:

receiving, by one or more processors, non-structured text that includes steps necessary to perform a maintenance routine for the device;

extracting, by one or more processors, an imperative statement contained in the non-structured text;

comparing, by one or more processors, an object in the imperative statement to a schematic of the device; and generating, by one or more processors, the step of the maintenance procedure from the non-structured text and the schematic of the device.

20. The computer-implemented method of claim 1, wherein determining the activity cost of the user performing the maintenance procedure is based on the monitored user activity data and cost factors associated with a predetermined skill of the user.

\* \* \* \* \*